Patented June 21, 1938

2,121,028

UNITED STATES PATENT OFFICE 2,121,028

CELLULOSIC WRAPPING MATERIAL

Henry A. Gardner, Chevy Chase, Md., and Arnold Kirkpatrick, St. Louis, Mo., assignors to Monsanto Chemical Company, St. Louis, Mo., a corporation of Delaware No Drawing. Application June 11, 1935, Serial No. 26,034

5 Claims. (Cl. 91—68)

The present invention relates to resin compositions, and in particular to compositions which are especially adapted for use in the preparation of plastics and coating materials. The main objects of the invention are to provide plastic and film-forming compositions: which are highly resistant to water, moisture and other permeating fluids, which are highly soluble in most organic solvents, and readily compatible with cellulosic compositions and other plastic materials, which are of light color, and do not readily discolor under the action of ultra-violet light, which adhere strongly and permanently to smooth, glossy surfaces, which form solutions of relatively low viscosity and may, therefore, be of high concentration, which are non-toxic, tasteless and odorless, and do not become rancid upon aging, and which are especially suitable for coating wrapping materials for food products.

These and other objects will become apparent upon perusual of the appended specification.

It has heretofore been proposed to prepare artificial resins of the so-called alkyd type by condensing a polyhydroxy alcohol, such as glycerol or glycol, with a polycarboxylic acid or preferably the anhydride of such acid. Among the acids the anhydrides of which have been proposed for this purpose, are phthalic acid, succinic acid, maleic acid, adipic acid, citric acid, etc. Although these compositions possess many virtues, they are, in some respects, not entirely satisfactory for certain purposes. For example, their utility in the preparation of lacquers and varnishes has been impaired because of their relatively low solubility in most common organic solvents, and because of their relatively slight compatibility with other lacquer materials, such as cellulose compositions, including nitrocellulose, cellulose acetate, benzyl and benzoyl cellulose, etc.

They are also of a pronounced brownish color and frequently of high acid number which tends to reduce their value for many purposes.

It has heretofore been proposed to obviate these difficulties by incorporating into the resins a fatty acid, such as oleic acid, stearic acid, ricinoleic acid, or the oils comprising the glycerides of these acids. However, complete compatibility of the fatty acid or the glyceride thereof with the resin, is rather difficult of attainment. Furthermore, this addition of fatty acid or fatty acid glyceride does not improve the color characteristics of the material, and it is also found that the acids tend to impart objectionable tastes or odors to the material, either immediately upon incorporation, or after aging. For this latter reason, the modified resins are not entirely satisfactory for coating wrapping materials for food products.

The present invention is based upon the discovery that alkyd type resins obtained by condensation or reaction of a dihydroxy alcohol and a polycarboxylic acid, as above described, may be combined with resins obtained by the interaction of an aromatic sulfonamid and an aldehyde to obtain products which possess excellent solubility and color characteristics, and which are otherwise substantially free from the objectionable features heretofore encountered in connection with alkyd type resins.

The preparation of the component resins comprising the new material may proceed in conventional manner. For example, the dihydroxy alcohols, such as ethylene glycol, propylene glycol, butylene glycol or glycol ethers, such as diethylene glycol or other dihydroxy alcohols may be employed. These dihydroxy alcohols may be admixed with each other or with other polyhydroxy compounds, such as glycerol. The polycarboxylic acid, or preferably its anhydride, such as phthalic anhydride, and the dihydroxy alcohol are merely heated together in suitable proportions to a fairly high temperature. The preparation of the reaction product of the aromatic sulfonamid and the aldehyde may proceed in accordance with the disclosures of German Patents 359,675, or 369,644, which contain descriptions of a plurality of resins of this type. An example of a material which is available in quantities upon the market and which may be employed to furnish the aldehyde aromatic sulfonamid reaction product, thus obviating the necessity of preparing this material, is sold under the trade name, Santolite MHP.

In the incorporation of the resins into each other, the alkyd resin is preferably maintained in a relatively fluid condition by heating it to a temperature of approximately 200° C. The aromatic sulfonamid-aldehyde reaction product is merely incorporated thereinto and the material is allowed to stand at a relatively high temperature for a short period of time. A suitable plasticizer may also be incorporated at this time into the composition. In view of the remarkable solubility characteristics of the material, practically any of the conventional plasticizers may be employed, and selection of one of satisfactory characteristics is largely determined by the material into which the composition is to be incorporated. For example, if it is to be combined with cellulose compositions, a plasticizer which is also a satisfactory plasticizer for the cellulose material should be selected. An example of a plasticizer which is eminently suitable for use in most compositions containing the new resin, is methyl phthalyl ethyl glycolate. Other esters of phthalyl glycolate, including the butyl and propyl esters, may also be employed for many purposes. However, these latter plasticizers are not particularly satisfactory if the composition is designated for admixture with cellulose acetate, but with nitrocellulose they are quite satisfactory. These compositions are of the general formula

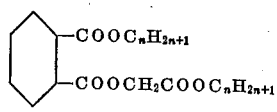

where $n$ is any whole number. Other plasticizers, such as toluene sulfonamid and dibutyl or diethyl phthalate, camphor, etc. may also be employed if desired.

The new resin compositions may be incorporated with almost any of the common organic solvents; examples of the latter include methyl, ethyl, propyl, butyl, and amyl alcohols, diacetone alcohol, ketones, such as acetone, esters, such as ethyl or methyl acetate; hydrocarbons, such as toluene and benzene, if incorporated with a small amount (10-15%) of an ester, such as ethyl acetate, may also be employed as solvents. Compositions obtained by addition of a solvent may be employed directly as lacquers, or they may be admixed with many of the common cellulose compositions, including nitrocellulose, cellulose acetate and benzyl and benzoyl cellulose, with which materials the new resin is highly compatible. The cellulose material, when thus modified, is characterized by an unusual degree of resistance to water and moisture, as well as vapors such as may be emitted by food products. They are also characterized by substantially complete lack of odor and they do not contain any fatty acids which are subject to decomposition upon aging. For that reason cellulosic compositions, such as cellulose acetate, containing the new resins as modifiers, are highly suitable for use in the preparation of compositions for coating paper or similar material employed in wrapping cigarettes and food products.

An excellent wrapping material for foods may be obtained by coating regenerated cellulose, such as the product sold under the trade name of "cellophane" upon one or both sides by dipping or spraying with cellulose acetate or cellulose nitrate containing a resin prepared in accordance with the provisions of this invention. The composition adheres strongly and permanently to the regenerated cellulose sheets and imparts thereto a most unusual degree of resistance to water, moisture and other permeating fluids. In order to test the resistance to water of the coating material, a sheet of "cellophane" which was untreated was stretched over the bottom of a tube and a few crystals of a water soluble dye placed upon the top thereof. The end of the tube covered by the "cellophane" was then immersed in water and within a period of thirty seconds sufficient moisture had permeated through the membrane to cause the dye to run and thus to discolor the supporting film. In contra-distinction, similar sheets of "cellophane" which were coated with a lacquer composition prepared in accordance with the provisions of this invention were found to be entirely resistant to permeation by water, even after a period of immersion of 24 hours, or more.

In the preparation of the resins constituting the subject matter of this invention, glycol has been suggested as constituting a suitable polyhydroxy alcohol and phthalic anhydride as constituting a satisfactory polycarboxylic acid for the preparation of the alkyd resin. It is to be understood that glycerol admixed with glycol or diethylene glycol may be employed in lieu of ethylene glycol. However, they are somewhat less satisfactory than the simple ethylene glycol. Any of the aromatic sulfonamids may be employed to react with an aldehyde to form the second component of the resin material. Examples of such sulfonamids are ortho, meta or para toluene sulfonamid, simple phenyl sulfonamid, xylyl sulfonamid, etc. As examples of aldehydes which may be reacted with these sulfonamid products may be mentioned formaldehyde, ethyl aldehyde, furfuraldehyde, as well as other materials containing the reactive methylene group, such as paraldehyde, hexamethylenetetramine, etc.

The following constitutes a specific example of the preparation of a material in accordance with the provisions of the present invention. Phthalic anhydride in the ratio by weight of 75 parts is incorporated with ethylene glycol in the ratio of 45 parts, and heated to a temperature of 240° C. At this point 5 additional parts of ethylene glycol are added and heating is continued at a temperature range of 240–250° C. for a period of about 30 minutes. The product is then allowed to cool approximately to 200° C. at which point 50 grams of para toluene sulfonamidaldehyde resin, prepared in accordance with any of the examples of the German patents above referred to, or if preferred a commercial product such as Santolite MHP, may be used. The temperature of 200° C. is maintained for 10 minutes, at the end of which time there is added 50 grams of methyl phthalyl ethyl glycolate, or any other conventional plasticizer, and the temperature is then maintained at 150–160° C. for a further period of 10 minutes. The resultant resin will be found to have the extremely low acid value of about 15 and will be found to be quite soluble in any of the ordinary organic solvents, such as acetone, alcohols, esters of alcohols, ketones, toluol or xylol. The proportions, temperatures and periods of time above given are not critical, but are merely exemplary, and may be varied over a wide range.

The material is highly compatible with most cellulose materials, including even cellulose-acetate which is compatible with but relatively few materials. For example, ordinary alkyd resins are incompatible with the cellulose acetate. However, when they are combined with aromatic sulfonamid resins in accordance with the provisions of the present invention, they become readily compatible and the resin itself exerts a pronounced plasticizing action upon the cellulosic material. The following is a typical formula of a cellulose composition containing the new material:

| | Parts by weight |
|---|---|
| Nitrocellulose | 8 |
| Resin prepared in accordance with the example | 12 |
| Butyl acetate | 20 |
| Ethyl acetate | 20 |
| Toluol | 40 |

Other resins, natural or artificial, including gum damar, shellac rosin, ester gum, vinyl resin, or mixtures of any two or more of these, may also be incorporated into the composition.

The composition as thus prepared may be spread upon practically any surface and it dries very rapidly, forming clear transparent films which strongly adhere to the supporting surface and exhibit great toughness, strength and water resistance. This particular material is eminently satisfactory for coating "cellophane" films in order to impart moisture resistance thereto. Films of "cellophane" so coated are also free from the strong and objectionable gloss which frequently characterizes such materials.

From the foregoing description, it will be apparent that resins prepared in accordance with the provisions of this invention are characterized by unusual solubility and compatibility characteristics and possess an unusual number of additional highly desirable characteristics. For this reason they are highly valuable as commercial products.

Although we have described only the preferred embodiments of the invention, it will be apparent to those skilled in the art that the invention is not limited to these specific forms and that numerous modifications may be made therein without departure from the spirit of the invention or the scope of the appended claims.

What we claim is:

1. As a new article of manufacture, a sheet of cellulosic wrapping material coated with a moisture resisting film comprising a cellulose ester and a resin compatible therewith; said resin comprising a previously prepared mass of a compatible phthalate ester, an alkyd resin resulting from the condensation of phthalic anhydride and a glycol, and a substance resulting from the condensation of an aromatic sulfonamid and an aldehyde.

2. As a new article of manufacture, a sheet of cellulosic wrapping material coated with a moisture resisting film comprising a cellulose ester and a resin compatible therewith; said resin comprising a previously heated and reacted mass of a compatible phthalate ester, an alkyd resin resulting from the condensation of phthalic anhydride and a glycol, and a substance resulting from the condensation of an aromatic sulfonamid and an aldehyde.

3. The product of claim 2 in which the phthalate is a compatible glycolate.

4. The product of claim 2 in which the sheet consists of regenerated cellulose.

5. As a new article of manufacture, a sheet of cellulosic wrapping material coated with a moisture resisting film comprising a cellulose ester and a resin; said resin comprising a reacted mass of methyl phthalyl ethyl glycolate, phthalic anhydride-glycol condensate, and toluene sulfonamid aldehyde condensate.

HENRY A. GARDNER.
ARNOLD KIRKPATRICK.